(12) United States Patent
Hirata et al.

(10) Patent No.: US 8,137,537 B2
(45) Date of Patent: Mar. 20, 2012

(54) FILTERED WATER MONITORING DEVICE AND FILTERED WATER MONITORING SYSTEM

(75) Inventors: Yuichiro Hirata, Tokyo (JP); Seigo Murakami, Tokyo (JP); Katsuya Nozaki, Kumamoto (JP)

(73) Assignees: Hirata Corporation (JP); Kumamoto Prefecture (JP)

( * ) Notice: Subject to any disclaimer, the term of this patent is extended or adjusted under 35 U.S.C. 154(b) by 777 days.

(21) Appl. No.: 11/921,169

(22) PCT Filed: Jun. 7, 2006

(86) PCT No.: PCT/JP2006/311454
§ 371 (c)(1),
(2), (4) Date: Dec. 2, 2008

(87) PCT Pub. No.: WO2006/132289
PCT Pub. Date: Dec. 14, 2006

(65) Prior Publication Data
US 2009/0090663 A1    Apr. 9, 2009

(30) Foreign Application Priority Data
Jun. 10, 2005    (JP) .................................. 2005-170287

(51) Int. Cl.
*B01D 35/00*    (2006.01)
*C02F 1/00*    (2006.01)

(52) U.S. Cl. .............. 210/93; 210/637; 210/745; 73/36; 73/61.41

(58) Field of Classification Search ..................... 210/85, 210/96.1, 103, 96.2
See application file for complete search history.

(56) References Cited

U.S. PATENT DOCUMENTS

| 3,951,853 | A | * | 4/1976 | Suwala | 516/123 |
| 4,014,736 | A | * | 3/1977 | Sexton | 162/38 |
| 5,190,666 | A | * | 3/1993 | Bisconte | 210/744 |
| 2004/0035769 | A1 | * | 2/2004 | Mouhebaty | 210/130 |

FOREIGN PATENT DOCUMENTS

| JP | 07-294431 | 11/1995 |
| JP | 10-024283 | 1/1998 |
| JP | 2000-342937 | 12/2000 |
| JP | 2001-062263 | 3/2001 |
| JP | 2003-302392 | 10/2003 |
| JP | 2004-216311 | 8/2004 |
| JP | 2005-013992 | 1/2005 |

\* cited by examiner

*Primary Examiner* — Krishnan S Menon
*Assistant Examiner* — Allison M Gionta
(74) *Attorney, Agent, or Firm* — Bacon & Thomas, PLLC (57) ABSTRACT

The present invention provides a filtered water monitoring device used for detecting damages in a filtration medium installed inside a membrane filtration water clarification device, thereby monitoring degradation of a performance thereof, in order to secure safety of filtered water flowing out from the membrane filtration water clarification device, comprising a branch filtered water pipeline system which is branched from a filtered water pipeline system connected to an outlet of the membrane filtration water clarification device, a filtered water observation plate which is installed in a certain position of the branch filtered water pipeline system, imaging means which takes an image of the filtered water in an observation tank of the filtered water observation plate and outputs image information thereon, and image analyzing means which receives the image information output from the imaging means, and compares the image information with a stored image pattern to identify impurities contained in the filtered water.

12 Claims, 6 Drawing Sheets

FILTERED WATER MONITORING DEVICE AND FILTERED WATER MONITORING SYSTEM

BACKGROUND OF THE INVENTION

1. Field of the Invention

In a membrane filtration water clarification device or a membrane filtration water clarification system used to clarify any water sources including natural water such as water of river, water of lake and underground water, there is installed a filtration medium. The present invention relates to a filtered water monitoring device and a filtered water monitoring system which detect damages in such filtration medium, thereby monitoring degradation of a performance thereof, in order to secure safety of filtered water.

2. Description of the Prior Art

As a water clarification facility for a water clarification plant which purifies natural water to obtain clean water, a combination of a coagulation and sedimentation basin and a sand filtration facility has conventionally been used often. This facility has problems such as a large scale, a high construction cost, difficulty in automation, difficulty in operation and management, and difficulty in increasing water quality due to a large amount of additives such as a coagulant, and there thus has been proposed and realized various membrane filtration water clarification systems employing high performance filtration membranes in place of this facility.

In each of these membrane filtration water clarification systems, a performance and a life of the filtration membrane constituting the filtration medium are definitely important elements. Thus a development of a high quality filtration membrane, and a simple monitoring system which detects damages in the filtration medium thereby monitoring degradation of a performance thereof are required with this respect.

As the filtration membrane, a hollow fiber membrane module has conventionally been developed and used (refer to Japanese Laid-Open Patent Publications No. 2000-342937, 2004-216311 and 2005-013992). This module is made by bundling thousands to ten thousands of hollow fibers, and storing the bundle in a case housing. As the monitoring system of the performance degradation due to damages, there have been proposed various methods and devices such as one which uses an optical sensor to detect bubbles which are generated by entering air from the outside of a hollow fiber membrane into the inside thereof, one which causes gas containing particles to flow through a hollow fiber membrane module, and measures the number of the particles in the gas which has passed the hollow fiber membrane by a particle measuring device provided with a laser light source, and one which fills a secondary side of a hollow fiber membrane with water, feeds by pressure a certain amount of gas from a primary side, maintains a certain pressure, and measures the quantity of water pressed out from the primary side to the secondary side of the hollow fiber membrane.

However, any of these monitoring systems indirectly grasp the state of damages in the filtration membrane by investigating the factors other than the filtered water while the operation of the membrane filtration water clarification system is temporarily suspended. So there remain points to be improved in terms of reliability of the detection of damages in the filtration membrane and the readiness of the operation such as complicated adjustments of the measuring devices.

Moreover, though, as a device for monitoring a state of water by means of an image analysis, there has been proposed a device which identifies microorganisms, which adversely affect filtration, in water flowing into a water clarification facility, the device is not intended for the detection of damages in the filtration membrane, and has a different configuration (refer to Japanese Laid-Open Patent Publication No. H10(1998)-024283).

SUMMARY OF THE INVENTION

An object of the present invention is to solve the above problems of the conventional monitoring systems which monitor degradation of a performance of a filtration membrane due to damages therein, and to provide a filtered water monitoring device and a filtered water monitoring system which enable detection of damages in a filtration medium by directly monitoring filtered water by means of image analysis for 24 hours in real time, thereby increasing reliability and readiness of the operation of detecting the damages in the filtration medium and monitoring degradation of the performance thereof, resulting in securing more safety of the filtered water flowing out from the membrane filtration water clarification device and the membrane filtration water clarification system.

According to the present invention, the above problems are solved by following filtered water monitoring device, in other words, a filtered water monitoring device used for detecting damages in a filtration medium installed inside a membrane filtration water clarification device, thereby monitoring degradation of a performance thereof, in order to secure safety of filtered water flowing out from the membrane filtration water clarification device, comprising a branch filtered water pipeline system which is branched in order to collect specimen water from a filtered water pipeline system connected to an outlet of the membrane filtration water clarification device, a filtered water observation plate which is installed in a certain position of the branch filtered water pipeline system, imaging means which takes an image of the filtered water flowing in an observation tank of the filtered water observation plate, and outputs image information thereon, and image analyzing means which receives the image information output from the imaging means, and compares the image information with a stored image pattern to identify impurities contained in the filtered water flowing out from the membrane filtration water clarification device.

With this filtered water monitoring device, it is possible to monitor filtered water flowing out from the membrane filtration water clarification device, based on the image analysis for 24 hours in real time, by opening the filtered water pipeline system connected to the outlet of the membrane filtration water clarification device and the branch filtered water pipeline system for 24 hours, and by operating the imaging means and the image analyzing means for 24 hours without suspending the operation of the membrane filtration water clarification device. Moreover, it is possible to remotely monitor the filtered water by means of a network of a computer constituting the image analyzing means, and since the observing/measuring devices are only the filtered water observation plate, the imaging means and the image analyzing means, they can be easily adjusted. Further, it is also possible to manage traceability (history) of the filtered water by accumulating data relating to the received information and the analyzed results in the image analyzing means.

With this configuration, it is possible to increase the reliability and the readiness of the operation of detecting damages in the filtration medium of the membrane filtration water clarification device, and to increase the reliability and the readiness of the operation of monitoring the degradation of the performance thereof, thereby securing more safety of the filtered water flowing out from the membrane filtration water clarification device.

Moreover, according to the present invention, the above problems are solved by following filtered water monitoring system, in other word, a filtered water monitoring system used for detecting damages in a filtration medium installed inside each of multiple membrane filtration water clarification devices provided in parallel to form a membrane filtration water clarification system, thereby monitoring degradation of a performance thereof, in order to secure safety of filtered water flowing out from the membrane filtration water clarification system, comprising a branch filtered water pipeline system which is branched in order to collect specimen water from a filtered water pipeline system connected to an outlet of each of multiple membrane filtration water clarification devices, a filtered water observation plate which is installed in a certain position of the branch filtered water pipeline system, imaging means which takes an image of the filtered water flowing in an observation tank of the filtered water observation plate sequentially for the multiple filtered water observation plates, and outputs image information thereon, and image analyzing means which receives the image information output from the imaging means, and compares the image information with a stored image pattern to identify impurities contained in the filtered water flowing out respectively from the multiple membrane filtration water clarification devices.

With this filtered water monitoring system, it is possible to monitor filtered water flowing out from each of the multiple membrane filtration water clarification devices provided in parallel to form the membrane filtration water clarification system, based on the image analysis for 24 hours in real time, by opening the filtered water pipeline systems connected to the outlet of each of the multiple membrane filtration water clarification devices and the branch filtered water pipeline systems for 24 hours, and by operating the imaging means and the image analyzing means for 24 hours without suspending the operation of the membrane filtration water clarification system. Moreover, it is possible to remotely monitor the filtered water by means of a network of a computer constituting the image analyzing means, and since the observing/measuring devices are only the multiple filtered water observation plates, the imaging means, and the image analyzing means, they can be easily adjusted. Further, it is also possible to manage traceability (history) of the filtered water by accumulating data relating to the received information and the analyzed results in the image analyzing means.

With this configuration, it is possible to increase the reliability and the readiness of the operation of detecting damages in the filtration medium of each of the multiple membrane filtration water clarification devices constituting the membrane filtration water clarification system, and to increase the reliability and the readiness of the operation of monitoring the degradation of the performance thereof, thereby securing more safety of the filtered water flowing out from the membrane filtration water clarification system.

According to a preferred embodiment, the multiple filtered water observation plates are integrated into one integrated filtered water observation plate. With this configuration, the operation to take the images of the filtered water flowing in each observation tank of the multiple filtered water observation plates sequentially for the multiple filtered water observation plates becomes extremely simple, and the operation to monitor the filtered water flowing out from each of the multiple membrane filtration water clarification devices thus becomes extremely simple. As a result, it is possible to increase the readiness of the operation of detecting damages in the filtration medium of each of the multiple membrane filtration water clarification devices constituting the membrane filtration water clarification system, and to increase the readiness of the operation of monitoring the degradation of the performance thereof.

According to another preferred embodiment, a defoaming device is provided on the upstream side of the filtered water observation plate. As a result, the filtered water flowing in the observation tank of the filtered water observation plate does not contain foams, and it is thus possible more precisely image and identify impurities (such as microorganisms) contained in the filtered water representing a result of damages of the filtration medium, thereby more precisely grasping the state of the damages in the filtration medium. Consequently, it is possible to increase the reliability of detecting damages in the filtration medium of the membrane filtration water clarification device or each of the multiple membrane filtration water clarification devices constituting the membrane filtration water clarification system, and to increase the reliability of monitoring the degradation of the performance thereof.

According to still another preferred embodiment, a step for banking up the impurities is provided in the observation tank of the filtered water observation plate. As a result, it is possible to bank up only the impurities contained in the filtered water flowing in the observation tank of the filtered water observation plate without suspending the flow of the filtered water, and to acquire and to surely image the impurities, and it is thus possible to increase the reliability of detecting damages in the filtration medium of the membrane filtration water clarification device or each of the multiple membrane filtration water clarification devices constituting the membrane filtration water clarification system, and to increase the reliability of monitoring the degradation of the performance thereof.

According to still another preferred embodiment, a porous plate for filtering the filtered water is provided in the observation tank of the filtered water observation plate. As a result, it is possible to filter only the impurities contained in the filtered water flowing in the observation tank of the filtered water observation plate by means of the porous plate without suspending the flow of the filtered water, and to acquire and to surely image the impurities, and it is thus possible to increase the reliability of detecting damages in the filtration medium of the membrane filtration water clarification device or each of the multiple membrane filtration water clarification devices constituting the membrane filtration water clarification system, and to increase the reliability of monitoring the degradation of the performance thereof.

According to still another preferred embodiment, a part of the filtered water pipeline system is removed, an orifice flange is joined and connected to the removed portion in a liquid tight manner, and an inlet end and an outlet end of the branch filtered water pipeline system are respectively connected on an upstream side and a downstream side of the orifice of the orifice flange. As a result, it is possible to connect and join the filtered water monitoring device or the filtered water monitoring system to an existing membrane filtration water clarification device or membrane filtration water clarification system by simply joining and connecting the orifice flange to the partially removed portion of the filtered water pipeline system connected to the outlet of the membrane filtration water clarification device or each of the multiple membrane filtration water clarification devices constituting the membrane filtration water clarification system, and their mounting and installation may be extremely simple.

EFFECTS OF THE INVENTION

As described above, with this filtered water monitoring device according to the present invention, it is possible to monitor filtered water flowing out from the membrane filtration water clarification device, based on the image analysis for 24 hours in real time, by opening the filtered water pipeline system connected to the outlet of the membrane filtration water clarification device and the branch filtered water pipeline system for 24 hours, and by operating the imaging means and the image analyzing means for 24 hours without suspending the operation of the membrane filtration clarification device. Moreover, it is possible to remotely monitor the filtered water by means of a network of a computer constituting the image analyzing means, and since the observing/measuring devices are only the filtered water observation plate, the imaging means and the image analyzing means, they can be easily adjusted. Further, it is also possible to manage the traceability (history) of the filtered water by accumulating data relating to the received information and the analyzed results in the image analyzing means.

With this configuration, it is possible to increase the reliability and the readiness of the operation of detecting damages in the filtration medium of the membrane filtration water clarification device, and to increase the reliability and the readiness of the operation of monitoring the degradation of the performance thereof, thereby securing more safety of the filtered water produced by the membrane filtration water clarification device.

Moreover, with the filtered water monitoring system according to the present invention, the same effects as described above are provided for the filtered water monitoring device installed on each of the multiple membrane filtration water clarification devices constituting the membrane filtration water clarification system, and effects of remote monitoring of the filtered water enabled by a network of a computer constituting the image analyzing means are maximized.

In addition, other various effects as described above can be provided.

DETAILED DESCRIPTION OF THE PREFERRED EMBODIMENTS

A filtered water monitoring system is used for monitoring degradation of a performance of a filtration medium installed inside each of multiple membrane filtration water clarification devices provided in parallel to form a membrane filtration water clarification system by detecting damages in the filtration medium in order to secure safety of filtered water flowing out from the membrane filtration water clarification system, and comprises a branch filtered water pipeline system which is branched in order to collect specimen water from a filtered water pipeline system connected to an outlet of each of the multiple membrane filtration water clarification devices, a filtered water observation plate which is installed in a certain position of the branch filtered water pipeline system, imaging means which takes an image of the filtered water flowing in an observation tank of the filtered water observation plate sequentially for the multiple membrane filtration water clarification devices, and outputs image information thereon, and image analyzing means which receives the image information output from the imaging means, and compares the image information with a stored image pattern to identify impurities contained in the filtered water flowing out respectively from the multiple membrane filtration water clarification devices.

First Embodiment

A description will now be given of a first embodiment of the present invention.

A membrane filtration water clarification device is used to clarify any water sources including natural water such as water of river, water of lake, and underground water. A filtered water monitoring device according to the first embodiment detects damages in a filtration membrane (filtration medium) installed in such membrane filtration water clarification device, and monitors degradation of a performance thereof (caused by the damages, end of service life, or the like) in order to secure safety of filtered water flowing out from the membrane filtration water clarification device. This filtration membrane may be, but not limited to, a hollow fiber membrane module.

Figure 1:
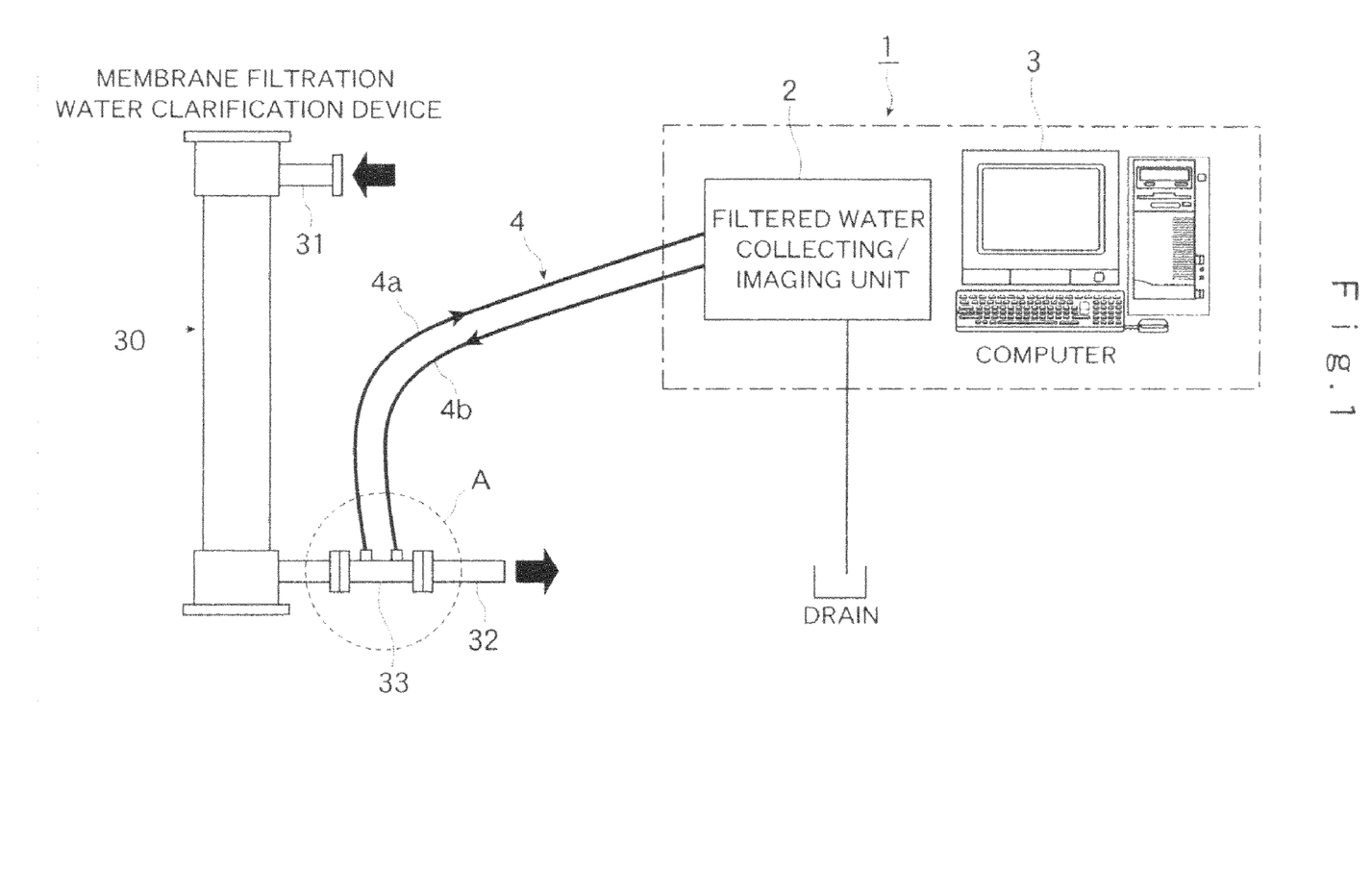
FIG. 1 is a schematic arrangement/configuration diagram of a filtered water monitoring device and a membrane filtration water clarification device according to a first embodiment of the present invention.

The filtered water monitoring device 1 according to the first embodiment comprises a filtered water collecting/imaging unit 2, and an image analyzing unit 3 which analyzes an image of the filtered water obtained by the filtered water collecting/imaging unit 2, and identifies impurities contained in the filtered water as schematically shown in FIG. 1. The filtered water collecting/imaging unit 2 is disposed in a certain position of the branch filtered water pipeline system 4, and the branch filtered water pipe line system 4 is branched from the filtered water pipeline system 32 connected to an outlet of the membrane filtration water clarification device 30 for collecting specimen water. The filtered water pipeline system 32 is a pipeline which supplies sites of reservation and consumption with the purified water (filtered water) obtained by the membrane filtration water clarification device 30. On this occasion, the impurities imply impurities such as chemicals and microorganisms which may adversely affect human body.

The branch from the filtered water pipeline system 32 to the branch filtered water pipeline system 4 is configured as described below. As shown in the enlarged view in FIG. 2, a part of the filtered water pipeline system 32 is removed in a neighborhood of a connection to the membrane filtration water clarification device 30, and an orifice flange 33 is joined and connected thereto in a liquid tight manner instead. This orifice flange 33 includes flange portions 33b, 33c on both ends of a short straight pipe portion 33a integrally, and these flange portions 33b, 33c are joined and integrated respectively to flanges 32a, 32b integrally formed on opposing ends of the partially removed portion of the filtered water pipeline system 32 by means of connection means such as bolts whereby integrated in the filtered water pipeline system 32.

Figure 2:
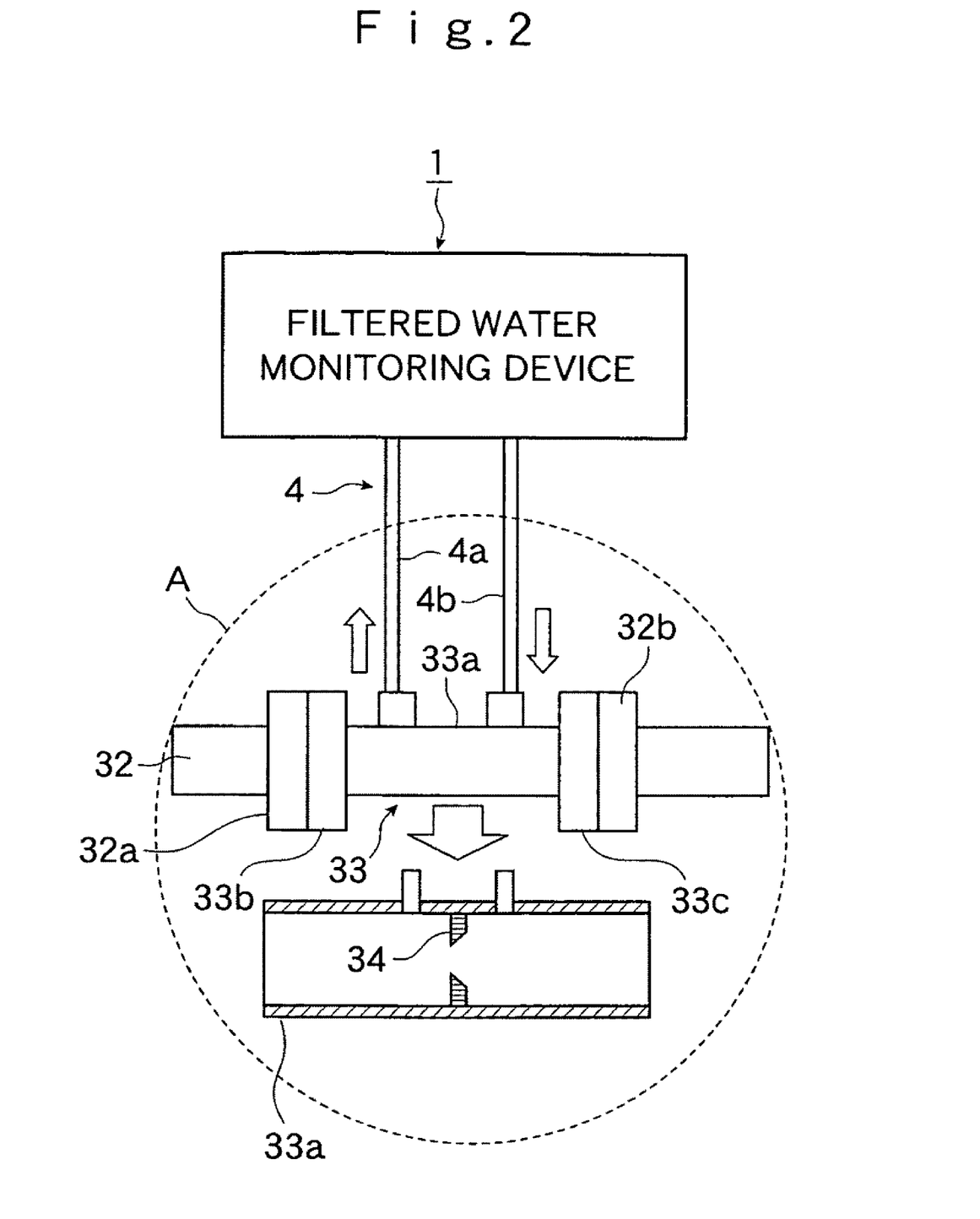
FIG. 2 shows a partially enlarged view of a portion A in FIG. 1 along with a partial cross sectional view.

An orifice 34 is provided inside the straight pipe portion 33a thereby generates a difference in pressure between forward and backward portions of this orifice 34 in the fluid (filtered water) flowing in the filtered water pipeline system 32. An inlet end of an outward pipe 4a of the branch filtered water pipeline system 4 is connected to a higher pressure side upstream of the orifice 34, an outlet end of an inward pipe 4b of the branch filtered water pipeline system 4 is connected to a lower pressure side downstream of the orifice 34, thereby leading the filtered water on the higher pressure side upstream of the orifice 34 to the filtered water monitoring device 1 via the outward pipe 4a, and returning excessive filtered water to the lower pressure side downstream of the orifice 34 via the inward pipe 4b. In this way, the filtered water monitoring device 1 according to the first embodiment can be attached to and installed on the existing membrane filtration water clarification device 30 just by joining and connecting the orifice flange 33 to the partially removed portion of the filtered water pipeline system 32 in the liquid tight manner, which is convenient. It should be noted that a restriction nozzle may be employed in place of the orifice 34. A water supply pipeline system 31 of natural water is connected to an inlet of the membrane filtration water clarification device 30.

Figure 3:
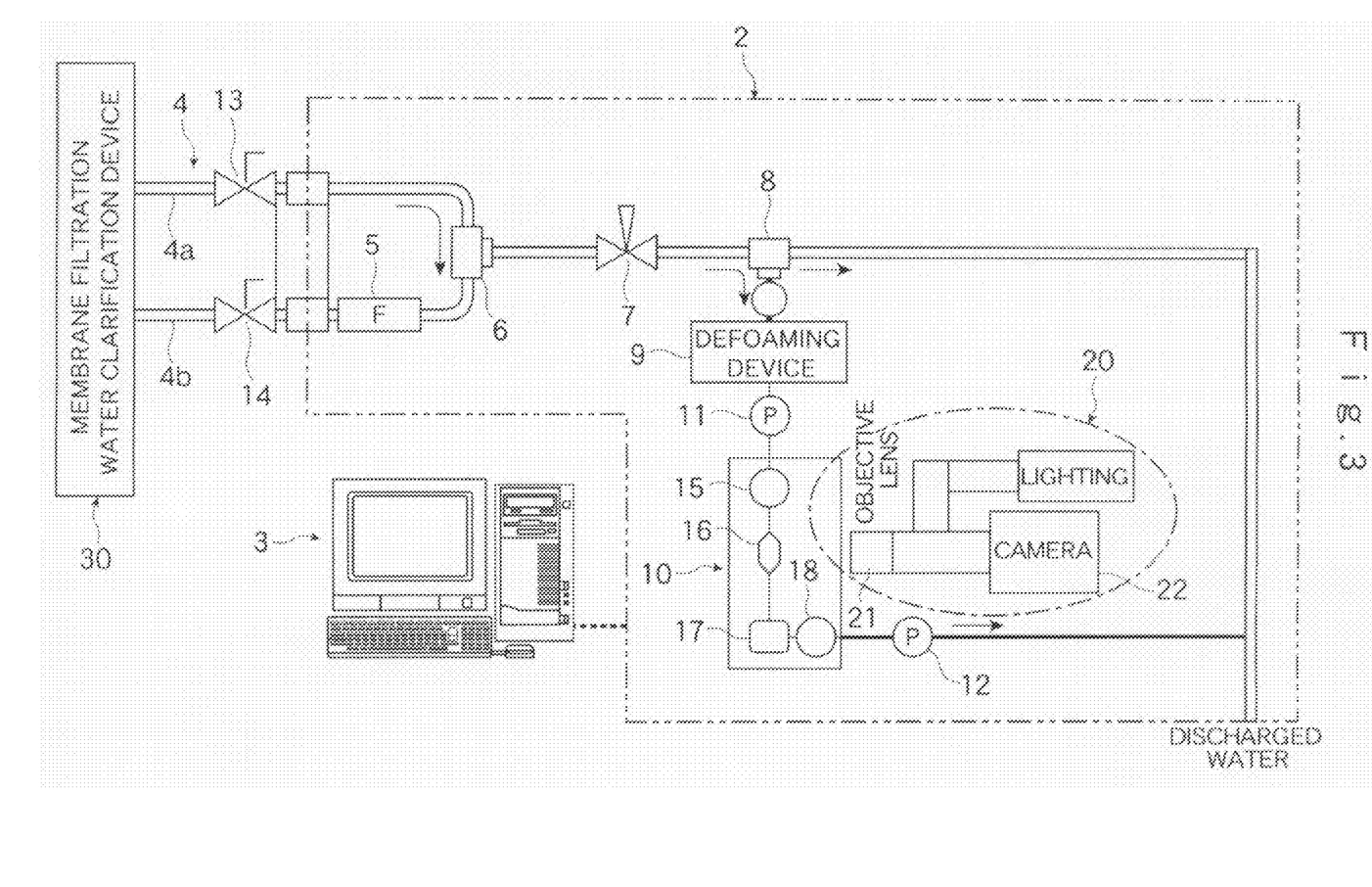
FIG. 3 is a schematic configuration diagram of the filtered water monitoring device.
Figure 4:
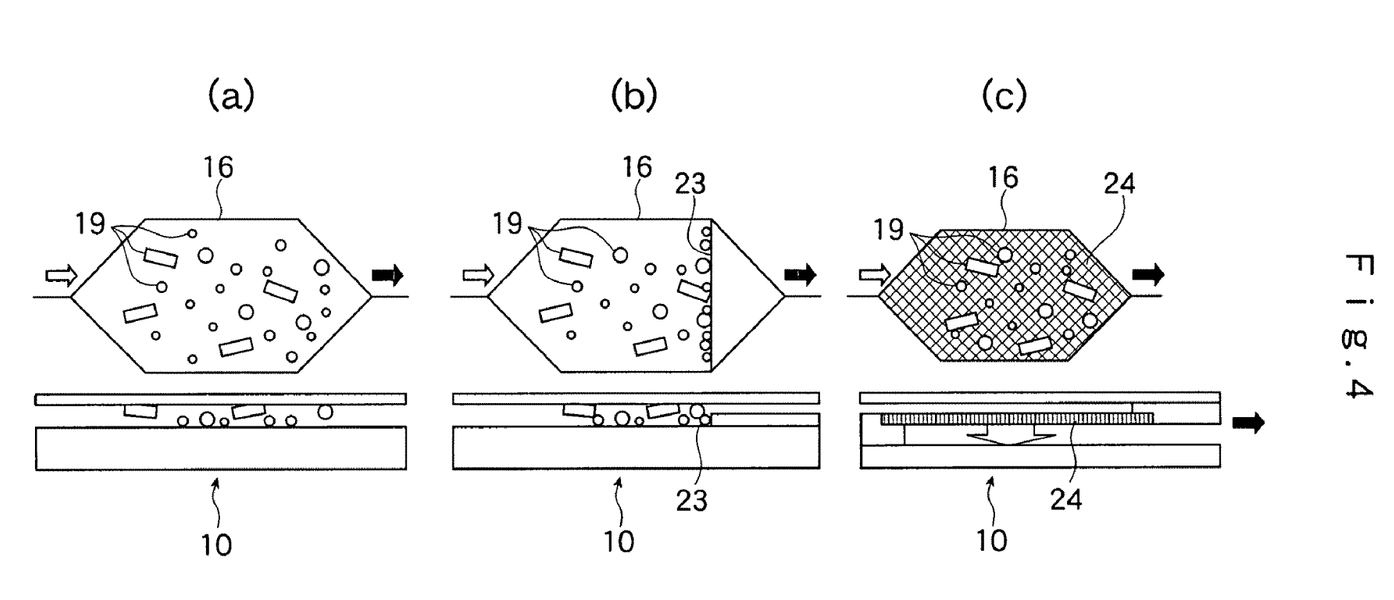
FIGS. 4A to 4C show examples of a configuration of an observation tank of a filtered water observation plate of the filtered water monitoring device.

FIG. 3 shows a detailed configuration of the filtered water monitoring device 1 according to the first embodiment. The specimen water led to the filtered water monitoring device 1 via the outward pipe 4a of the branch filtered water pipeline system 4 is led to the filtered water observation plate 10 via a first three-way connector 6, a needle valve 7, and a second three-way connector 8 while the specimen water is measured by a flowmeter 5 disposed upstream of the inward pipe 4b inside the filtered water collecting/imaging unit 2. Pumps 11, 12 are provided respectively at an inlet and an outlet of the filtered water observation plate 10. The pump 11 is responsible only for a pressure loss caused by the flow of the filtered water up to the pump 11 and a pressure loss caused by the flow of the filtered water from the pump 11 to the pump 12, a necessary output of the pump 11 can thus be relatively small, and an increase of the pressure of the filtered water is restrained low inside the filtered water observation plate 10, thereby eliminating an excessive force applied to the inside of the filtered water observation plate 10. This is especially advantageous if the filtered water observation plate 10 is formed by adhering two glass plates to each other.

The excessive filtered water, which has not flown toward the filtered water observation plate 10 at the first three-way connector 6, is returned to the lower pressure side downstream of the orifice 34 of the orifice flange 33 via the inward pipe 4b. The excessive filtered water flowing out from the pump 12 and the excessive filtered water which has not flown toward the filtered water observation plate 10 at the second three-way connector 8 merge as a drain, and are discarded. In this way, new filtered water always flows through the filtered water observation plate 10, and it is thus always possible to obtain the present state of the filtration membrane of the membrane filtration water clarification device 30. It should be noted that block valves 13, 14 are respectively provided in a certain position of the outward pipe 4a and the inward pipe 4b.

A defoaming device 9 is provided upstream side of the filtered water observation plate 10. This defoaming device 9 removes foams contained in the filtered water, which causes the filtered water flowing in an observation tank 16 of the filtered water observation plate 10 be defoamed, and it is thus possible to image and identify the impurities which are contained in the filtered water and represent a result of damages of the filtration membrane, resulting in more precise detection of the damages of the filtration membrane.

Figure 6:
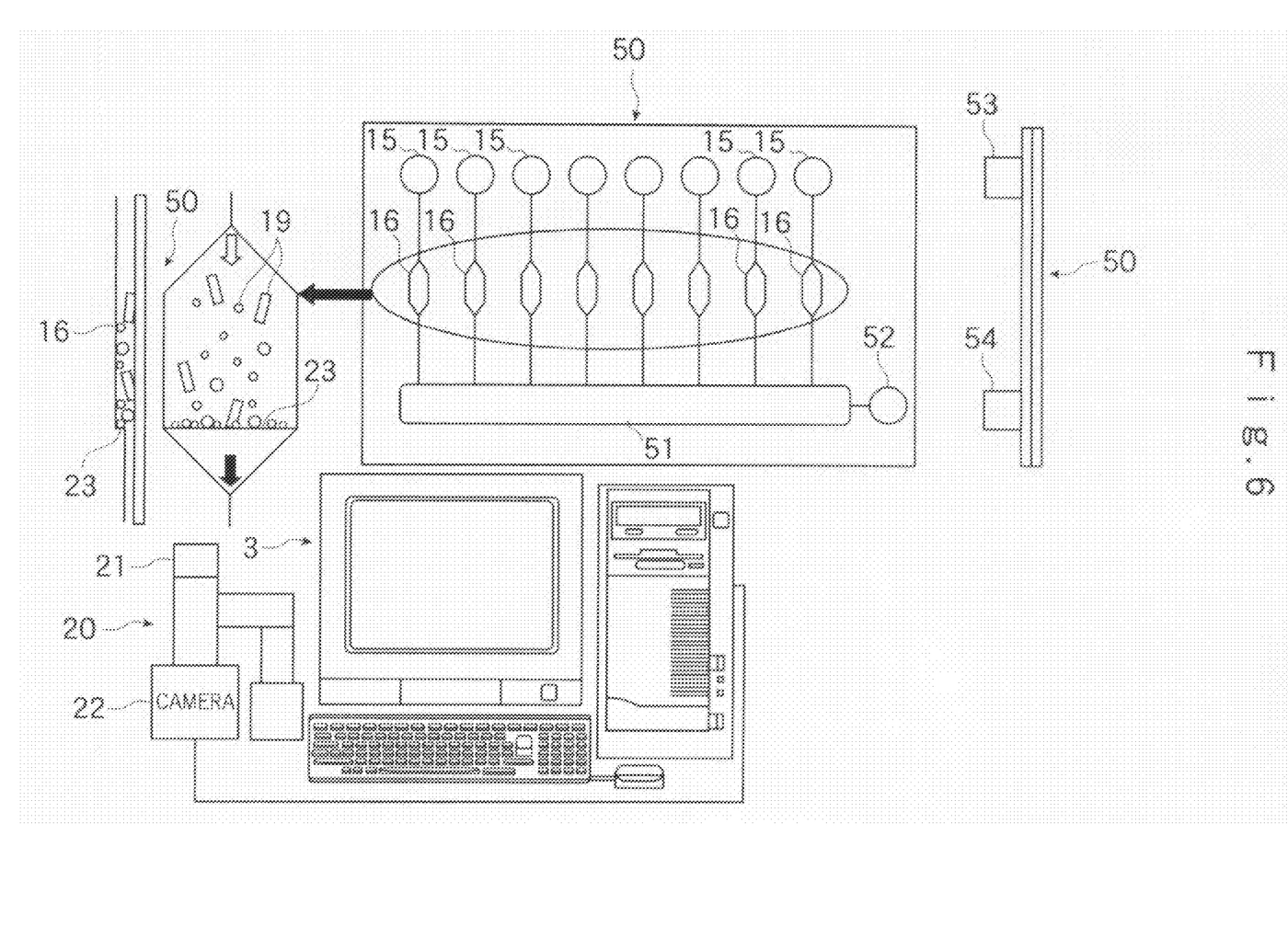
FIG. 6 is a schematic configuration diagram of a filtered water collecting/imaging unit of the filtered water monitoring system excluding a pipeline system and a defoaming device.

The filtered water observation plate 10 is made of any of materials such as glass, resin and metal, and is configured by adhering two plates coated by a hydrophilic membrane coat on surfaces thereof (refer to an integrated filtered water observation plate 50 described later which are constituted by integrating multiple filtered water observation plates 10 shown in FIG. 6), and a flow passage comprising an inlet side connector 15, the observation tank 16, a collection tank 17 and an outlet side connector 18 is formed in the joined portion. While the filtered water is flowing in the observation tank 16, an optical device (imaging means) 20 adjacently disposed takes an image thereof. Trashes such as minute stones and wood pieces, and microorganisms such as bacteria and bacilli, which damage the filtration membrane, are acquired in this image. These impurities are collectively denoted by reference numeral 19 in FIG. 4. What the materials (impurities) acquired in the image actually are, is analyzed and identified by the image analyzing unit (image analyzing means) 3 which receives the image information output from the optical device 20.

In the optical device 20, a digital camera 22 takes an image of the filtered water observed through an objective lens 21, and the digital camera 22 transmits the taken image information to the image analyzing unit 3. The image analyzing unit 3 is constituted by a computer, and when the computer receives the image information output from the optical device 20, the computer identifies shapes, sizes and numbers thereof based on image processing, and compares them with image patterns stored in a memory unit, thereby analyzing and identifying what the impurities contained in the filtered water are. The analyzing and identifying operation is executed by the computer while the image is enlarged on a display of the computer, and a person thus can confirm the identification. Moreover, the analyzing and identifying operation can be executed at a site remote from the optical device 20 by connecting the optical device 20 and the computer with each other via a network, enabling a remote monitoring of the filtered water. In this way, the impurities contained in the filtered water are identified, the numbers thereof are obtained, and it is thus possible to confirm the state of the damages of the filtration membrane installed inside the membrane filtration water clarification device 30.

The observation tank 16 and the collection tank 17 of the filtered water observation plate 10 are portions to extend the flow passage of the filtered water (specimen water), and, especially in the observation tank 16, it is possible not only to cause the filtered water to simply flow through the extended flow passage (refer to FIG. 4A) but also to bank up the impurities in the extended flow passage by forming a step 23 as shown in FIG. 4B, or to filter the filtered water by providing a porous plate 24 in the extended flow passage as shown in FIG. 4C in order to easily image the filtered water by the optical device 20 and to easily acquire the impurities during imaging. With this configuration, it is possible to bank up or filter by the porous plate 24 only the impurities contained in the filtered water without suspending the flow of the filtered water flowing in the observation tank 16, thereby acquiring and surely imaging the impurities. The collection tanks 17 serve as a header 51 which causes outlets of the observation tanks 16 of the respective filtered water observation plates 10 to be connected with each other when multiple filtered water observation plates 10 are integrated into the one integrated filtered water observation plate 50 (refer to FIG. 6).

The filtered water monitoring device 1 according to the first embodiment is configured as described above, and thus yields the following effects.

It is possible to monitor the filtered water flowing out from the membrane filtration water clarification device 30 in real time for 24 hours, based on the image analysis, by opening the filtered water pipeline system 32 connected to the outlet of the membrane filtration water clarification device 30 and the branch filtered water pipeline system 4 for 24 hours (the water supply pipeline system 31 connected to the inlet of the membrane filtration water clarification device 30 is obviously open in this case), and by operating the optical device (imaging means) 20 and the image analyzing unit (image analyzing means) 3 for 24 hours without suspending the operation of the membrane filtration water clarification device 30. Moreover, it is possible to remotely monitor the filtered water by means of the network of the computer constituting the image analyzing means, and since the observing/measuring devices are only the filtered water observation plate 10, the optical device 20, and the image analyzing unit 3, they can be easily adjusted. Moreover, it is also possible to manage the traceability (history) of the filtered water by accumulating data relating to the received information and the analyzed results in the image analyzing means 3. With this configuration, it is possible to increase the reliability and the readiness of the operation of detecting damages in the filtration membrane of the membrane filtration water clarification device 30, and to increase the reliability and the readiness of monitoring the degradation of the performance thereof, thereby securing more safety of the filtered water produced in and flowing out from the membrane filtration water clarification device 30.

Moreover, since the defoaming device 9 is provided upstream of the filtered water observation plate 10, the filtered water flowing in the observation tank 16 of the filtered water observation plate 10 does not contain foam, and it is thus possible to more precisely image and identify impurities (such as microorganisms) contained in the filtered water representing a result of damages of the filtration membrane, thereby more precisely grasping the state of the damages of the filtration membrane. As a result, it is possible to increase the reliability of detecting damages in the filtration membrane of the membrane filtration water clarification device 30, and to increase the reliability of monitoring the degradation of the performance thereof.

Moreover, if the step 23 for banking up the impurities or the porous plate 24 for filtering the filtered water is provided in the observation tank 16 of the filtered water observation plate 10, it is possible to bank up or filter only the impurities contained in the filtered water without suspending the flow of the filtered water flowing in the observation tank 16, thereby acquiring and surely imaging the impurities, resulting in an increase of the reliability of detecting damages in the filtration membrane of the membrane filtration water clarification device 30 and an increase of the reliability of monitoring the degradation of the performance thereof.

Moreover, the filtered water monitoring device 1 can be attached to and installed on the existing membrane filtration water clarification device 30 just by joining and connecting the orifice flange 33 to the partially removed portion of the filtered water pipeline system 32 connected to the outlet of the membrane filtration water clarification device 30 in the liquid tight manner, resulting in extremely simple attachment and installation thereof.

Second Embodiment

A description will now be given of a second embodiment of the present invention.

Figure 5:
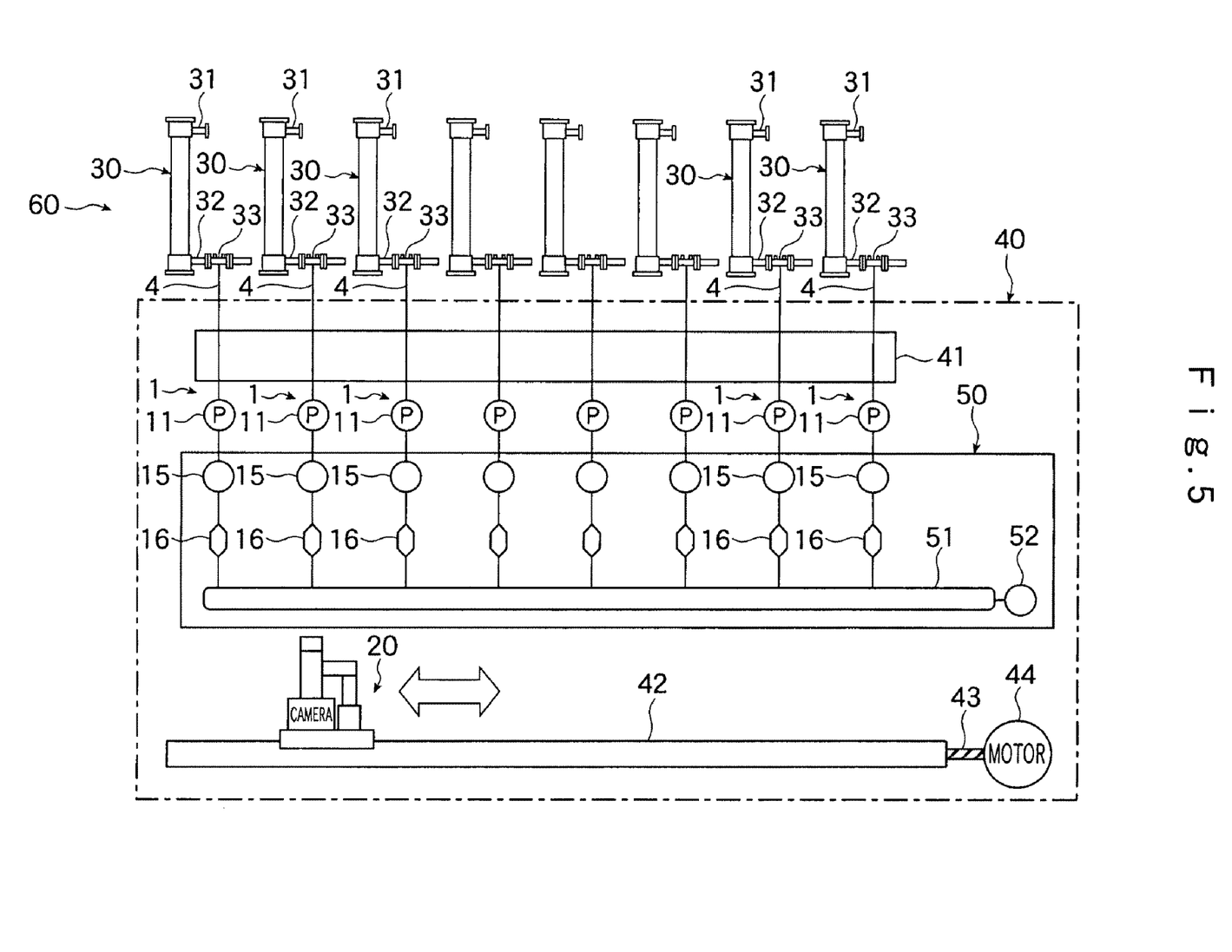
FIG. 5 is a schematic arrangement/configuration diagram of a filtered water monitoring system and a membrane filtration water clarification system according to a second embodiment of the present invention without showing an image analyzing unit.

A filtered water monitoring system 40 according to the second embodiment is constituted by attaching the filtered water monitoring device 1 to each of the multiple membrane filtration water clarification devices 30 provided in parallel to form a membrane filtration water clarification system 60 as shown in FIG. 5. In this case, multiple defoaming devices 9 are combined into a collective defoaming device 41. Moreover, multiple filtered water observation plates 10 are integrated into one integrated filtered water observation plate 50. Further, multiple collection tanks 17 are combined into a collective header 51 inside this integrated filtered water observation plate 50, and an outlet side connector 52 is connected to an outlet thereof In FIG. 6, connection tools 53 (multiple), 54 illustrated as protruding leftward at top and bottom locations in a side view of the integrated filtered water observation plate 50 are joined and connected respectively to the inlet side connectors 15 (multiple) and the outlet side connector 52 thereby feeding the filtered water (specimen water) into the integrated filtered water observation plate 50, and discharging it therefrom.

The optical device (imaging means) 20 can travel on a guide rail 42 in left/right directions in FIG. 5 by a thread coupling with a threaded rod 43 rotated by a motor 44 in the second embodiment. Then, images of the filtered water flowing in the respective multiple observation tanks 16 inside the integrated filtered water observation plate 50 are sequentially taken for the multiple observation tanks 16 (namely, for the multiple filtered water observation plates 10 before the integration), and the image information thereon is output to the image analyzing unit (image analyzing means) 3. Since the steps 23 are formed in the respective observation tanks 16, it is possible to bank up only the impurities contained in the filtered water, and to acquire and surely image the impurities without suspending the flow of the filtered water.

The image analyzing unit 3 receives the image information output from the optical device 20, and compares the image information with the stored image patterns to analyze and identify the impurities contained in the filtered water flowing out respectively from the multiple membrane filtration water clarification devices 30. As a result, it is possible to confirm the state of damages of the filtration membrane installed inside each of the multiple membrane filtration water clarification devices 30.

The respective operations of the multiple membrane filtration water clarification devices 30 constituting the membrane filtration water clarification system 60 and the respective operations of the multiple filtered water monitoring devices 1 are not basically different from those according to the first embodiment. The optical device 20 and the image analyzing unit 3 constituting the filtered water monitoring system 40 are not basically different from those according to the first embodiment.

The filtered water monitoring device 40 according to the second embodiment is configured as described above, and thus yields the following effects.

It is possible to monitor the filtered water flowing out from each of the multiple membrane filtration water clarification devices 30 provided in parallel to form the membrane filtration water clarification system 60 in real time for 24 hours, based on the image analysis, by opening the filtered water pipeline systems 32 connected respectively to the outlets of the multiple membrane filtration water clarification devices 30 and the branch filtered water pipeline systems 4 for 24 hours (the multiple water supply pipeline systems 31 connected respectively to the inlets of the multiple membrane filtration water clarification devices 30 are obviously open in this case), and by operating the optical device (imaging means) 20 and the image analyzing unit (image analyzing means) 3 for 24 hours without suspending the operation of the membrane filtration water clarification system 60. Moreover, it is possible to remotely monitor the filtered water by means of the network of the computer constituting the image analyzing unit 3, this effect is especially advantageous for the large-scale membrane filtration water clarification system 60, and since the observing/measuring devices are only the integrated filtered water observation plate 50, the optical device 20, and the image analyzing unit 3, they can be easily adjusted. Moreover, it is also possible to manage the traceability (history) of the filtered water by accumulating data relating to the received information and the analyzed results in the image analyzing means 3.

With this configuration, it is possible to increase the reliability and the readiness of the operation of detecting damages in the filtration membrane of each of the multiple membrane filtration water clarification devices 30 constituting the membrane filtration water clarification system 60, and to increase the reliability and the readiness of the operation of monitoring the degradation of the performance thereof, thereby securing more safety of the filtered water produced in and flowing out from the membrane filtration water clarification system 60.

Moreover, since the multiple filtered water observation plates 10 according to the first embodiment are integrated into the one integrated filtered water observation plate 50 according to the second embodiment, the operation of sequentially taking the images of the filtered water flowing in the respective observation tanks 16 of the respective multiple filtered water observation plates 10 for the respective multiple filtered water observation plates 10 becomes extremely simple, and the operation of monitoring the filtered water flowing out from each of the multiple membrane filtration water clarification devices 30 becomes extremely simple. As a result, it is possible to increase the readiness of the operation of detecting damages in the filtration membrane of each of the multiple membrane filtration water clarification devices 30 constituting the membrane filtration water clarification system 60, and to increase the readiness of the operation of monitoring the degradation of the performance thereof.

The present invention is not limited to the above embodiments, and may be modified in various ways within a scope not departing from the gist thereof.

What is claimed is:

1. A filtered water monitoring device for detecting damage in a filtration medium installed downstream of a membrane filtration water clarification device, thereby monitoring degradation of performance of the membrane filtration water clarification device in order to secure safety of filtered water flowing out from the membrane filtration water clarification device, the filtered water monitoring device comprising:
a branch filtered water pipeline system which is branched, in order to collect specimen water, from a filtered water pipeline system connected to an outlet of the membrane filtration water clarification device;
a filtered water observation plate which is installed in said branch filtered water pipeline system, and which includes an observation chamber, the filtered water observation plate being formed of two plates coated with a hydrophilic membrane and joined together face-to-face at a junction, wherein a flow passage through the filtered water observation plate is formed along the junction between the two plates, wherein the observation chamber is formed in the flow passage and at the junction between the two coated plates, and wherein opposing ends of the flow passage are respectively connected to inlet and outlet pipes of the branch filtered water pipeline system;
imaging means for capturing an image of the filtered water flowing through said observation chamber of said filtered water observation plate, and for outputting image information based on the captured image; and
image analyzing means for receiving the image information output from said imaging means, and for comparing the image information with a stored image pattern to identify impurities contained in the filtered water flowing out from said membrane filtration water clarification device.

2. A filtered water monitoring system for detecting damage in a filtration medium installed downstream of multiple membrane filtration water clarification devices provided in parallel to form a membrane filtration water clarification system, thereby monitoring degradation of performance thereof; in order to secure safety of filtered water flowing out from the membrane filtration water clarification system, the filtered water monitoring system comprising:
a branch filtered water pipeline system which is branched, in order to collect specimen water, from a filtered water pipeline system connected to an outlet of each of the multiple membrane filtration water clarification devices;
a filtered water observation plate, which is installed in said branch filtered water pipeline system, and which has a plurality of the flow passages arranged in parallel and extending through the filtered water observation plate, with an observation chamber within each of the flow passages;
imaging means for capturing an image of the filtered water flowing through each of the observation chambers of said filtered water observation plate, sequentially for a plurality of the observation chambers, and for outputting image information based on the captured images, the imaging means traveling on a guide rail transverse to the parallel flow passages; and
image analyzing means for receiving the image information output from said imaging means, and for comparing the image information with a stored image pattern to identify impurities contained in the filtered water flowing out from each of said multiple membrane filtration water clarification devices.

3. A filtered water monitoring system according to claim 2 further comprising a defoaming device provided upstream of said filtered water observation plate.

4. A filtered water monitoring system according to claim 2 wherein impurities contained in the filtered water are banked in said observation chambers of said filtered water observation plate.

5. A filtered water monitoring system according to claim 2 further comprising: a porous plate for filtering the specimen water provided in said observation chambers of said filtered water observation plate.

6. A filtered water monitoring system according to claim 2 further wherein the filtered water pipeline system includes an orifice flange and an inlet end and an outlet end of said branch filtered water pipeline system are respectively connected on an upstream side and a downstream side of an orifice of said orifice flange.

7. A filtered water monitoring device according to claim 1 further comprising a defoaming device provided on the upstream side of said filtered water observation plate.

8. A filtered water monitoring device according to claim 1 wherein impurities contained in the filtered water are banked in said observation chamber of said filtered water observation plate.

9. A filtered water monitoring device according to claim 1 further comprising: a porous plate for filtering the specimen water provided in said observation chamber of said filtered water observation plate.

10. A filtered water monitoring device according to claim 1 wherein the filtered water pipeline system includes an orifice flange and an inlet end and an outlet end of said branch filtered water pipeline system are respectively connected on an upstream side and a downstream side of an orifice of said orifice flange.

11. A filtered water monitoring device according to claim 1 wherein the observation chamber is a widened portion of the flow passage through the filtered water observation plate.

12. A filtered water monitoring device according to claim 2 wherein the filtered water observation plate is formed of two plates coated with a hydrophilic membrane and joined together face-to-face at a junction, wherein the parallel flow passages through the filtered water observation plate are formed along the junction between the two plates, wherein the observation chambers are respectively formed in the parallel flow passages and at the junction between the two coated plates, and wherein opposing ends of each flow passage are respectively connected to inlet and outlet pipes of the branch filtered water pipeline system.

\* \* \* \* \*